United States Patent Office 3,170,911
Patented Feb. 23, 1965

3,170,911
REACTIVE AZO DYESTUFFS
Jakob Benz, Munchenstein, August Schweizer, Muttenz, and Hans Wasem, Basel, Switzerland, assignors to Sandoz Ltd., Basel, Switzerland
No Drawing. Filed Aug. 10, 1961, Ser. No. 130,461
Claims priority, application Switzerland, May 14, 1959, 73,180/59
5 Claims. (Cl. 260—153)

This application is a continuation-in-part of application Ser. No. 28,526, filed May 12, 1960 (now abandoned), and relates to reactive dyestuffs of the formula

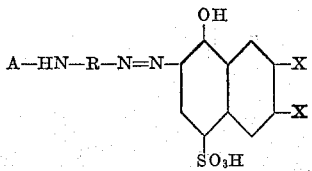

 (I)

wherein A is a fiber-reactive radical selected from the group consisting of monohalogeno-lower alkanoyl,
lower alkenoyl,
2,4-dihalogeno-1,3,5-triazinyl-(6),
2-amino-4-halogeno-1,3,5-triazinyl-(6),
2-lower alkylamino-4-halogeno-1,3,5-triazinyl-(6),
2-(di-lower alkyl)-amino-4-halogeno-1,3,5-triazinyl-(6),
2-lower hydroxy-alkylamino-4-halogeno-1,3,5-triazinyl-(6),
2-(di-lower hydroxy alkyl)-amino-4-halogeno-1,3,5-triazinyl-(6),
2-lower carboxyalkyl amino-4-halogeno-1,3,5-triazinyl-(6),
2-N-lower alkyl-N-lower sulfoalkyl-amino-4-halogeno-1,3,5-triazinyl-(6),
2-carboxyphenylamino-4-halogeno-1,3,5-triazinyl-(6),
2-sulfophenylamino-4-halogeno-1,3,5-triazinyl-(6),
2-sulfonaphthylamino-4-halogeno-1,3,5-triazinyl-(6),
2-disulfonaphthylamino-4-halogeno-1,3,5-triazinyl-(6),
2,6-dihalogeno-pyrimidyl-(4) and
4,6-dihalogeno-pyrimidyl-(2);

halogen having an atomic weight between 35 and 81; R is a radical selected from the group consisting of phenylene and naphthylene and bears from one to two sulfonic acid groups; and one x represents hydrogen and the other x —SO₃H.

The process consists in coupling 1 mole of the diazo compound of an amine of the general formula

A—HN—R—NH₂     (II)

wherein A and R possess the aforecited meanings, with 1 mole of 1-hydroxynaphthalene-4,6- or -4,7-disulfonic acid or 1 mole of a mixture of these two acids, or in reacting 1 mole of a diazine or triazine compound containing at least two groupings

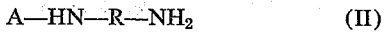

in which the halogen atom can be readily split off as an anion, or 1 mole of a functional derivative of a halogenated aliphatic acid in which the halogen atom can easily be split off as an anion, or of an unsaturated aliphatic acid whose C—C— multiple linkage is capable of addition with 1 mole of an aminoazo dyestuff of the general formula

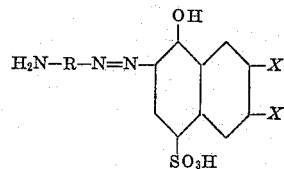

 (III)

wherein R and x possess the aforecited meanings, or with 1 mole of a mixture of the aminoazo dyestuffs derived from the two 1-hydroxynaphthalene-4,6- and -4,7-disulfonic acids.

The amine of Formula II is derived preferably from the following diamines: 1,3- or 1,4-diaminobenzene or their sulfonic or carboxylic acids, and 1,4- or 2,6-diaminonaphthalene and their sulfonic acids.

To produce the diazo compounds the amines of Formula II are either suspended or dispersed in a dilute mineral acid and directly diazotized, or, when they contain a water-solubilizing group, e.g., a carboxylic or sulfonic acid group, they are dissolved in water in the form of their neutral ammonium, sodium or potassium salts and indirectly diazotized. Diazotization is carried out preferably at temperatures between 0 and 20° C. The diazo compound obtained can be filtered off if necessary and employed for coupling as a concentrated aqueous paste.

The coupling of the diazo compound of an amine of Formula II with 1-hydroxynaphthalene-4,6- or -4,7-disulfonic acid or with a mixture of these two acids is conducted to best advantage in aqueous, weakly acid to alkaline medium at low temperatures, e.g., between 0 and 25° C.

The condensation of the aminoazo dyestuff of Formula III with a diazine or triazine compound containing at least two groupings —C=N—
|
Hal in which the halogen atom can be easily split off as an anion or with a functional derivative of a halogenated aliphatic acid, in which the halogen atom can easily be split off as an anion or of an unsaturated aliphatic acid whose C—C— multiple linkage is capable of addition is carried out preferably in aqueous medium at a pH-value between 3 and 9 and at temperatures of 0 to 100° C. depending on the reactivity of the compound used.

The introduction of a cyanuric radical (A) is best accomplished in aqueous medium at about 0° C. and at weakly acid reaction, e.g., at a pH-value of 3 to 5. The cyanuric halide is applied as such in solid form or dissolved in an organic solvent, e.g., acetone. For the primary condensation products of a cyanuric halide it is best to choose a temperature of 30° to 60° C. and a pH-value of 4 to 6, while for the di- and trihalogeno-pyrimidine (A) radicals temperatures between 40° and 100° C. are the most suitable, the pH region being preferably between 3 and 9.

The simplest way of introducing the acid radical is to employ the appropriate acid halide, or in certain cases the acid anhydride. The operation is carried out at low temperatures, e.g., at 0–20° C., and in presence of acid-binding agents such as sodium carbonate, sodium hydroxide, calcium hydroxide or sodium acetate, and the medium is of weakly acid, neutral or weakly alkaline reaction, e.g., in the pH region 3 to 9. For acylation the carboxylic acid chlorides are employed as such or dissolved in two to five times their amount of benzene, chlorobenzene, methylbenzene, dimethylbenzene or acetone and added dropwise to the well buffered solution of the compound containing the amino group at a temperature of, e.g., 2–5° C. Acylation with the anhydrides can be carried out in the same way.

On completion of condensation or coupling the solution or suspension may be neutralized and the final reactive dyestuff is precipitated from it with sodium or potassium chloride or with acid, and subsequently filtered with suction, washed and dried.

The reactive dyestuffs of the invention are suitable for the dyeing, padding and printing of fibers of animal origin, e.g., wool and silk; synthetic polyamide fibers, e.g., nylon; leather; cellulose fibers, e.g., cotton and linen and hemp; fibers of regenerated cellulose, e.g., viscose filament yarn and viscose staple fiber and cuprammonium rayon; and mixtures of these fibers. The optimum conditions of application vary with the type of fiber and the dyestuffs used. Animal and polyamide fibers are dyed, printed or fixed preferably in acid, neutral or weakly alkaline medium, e.g., in presence of acetic acid, formic acid, sulfuric acid, ammonium sulfate, sodium metaphosphate, etc. It is also possible to dye in the acetic acid to neutral region in presence of levelling agents, e.g., polyoxyethylated fatty amines or mixtures of these and alkylpolyglycol ethers, and to adjust the bath to a neutral or weakly alkaline reaction at the end of dyeing with small amounts of an agent of alkaline reaction, e.g., ammonia, sodium bicarbonate, soda etc., or compounds which react alkaline on heating, e.g., hexamethylene tetramine and urea. The goods are then thoroughly rinsed and soured out if necessary with a little acetic acid.

The dyestuffs are dyed, padded, printed or fixed on cellulose fibers in an alkaline medium, e.g., in presence of sodium carbonate or bicarbonate, sodium or potassium hydroxide solution, sodium metasilicate, sodium borate, trisodium phosphate, ammonia etc. It is often an advantage to add a mild oxidizing agent such as sodium 1-nitrobenzene-3-sulfonate to the dyebath, padding liquor or printing paste, in order to preclude reduction effects. Normally, the dyestuffs are fixed on cellulosic fibers by heat treatment. Some of the dyestuffs according to the reactivity of the reactive group can also be dyed or fixed at lower temperatures, e.g., 20–40° C.

The dyeings and prints on cellulose fibers are notable for their excellent fastness to wet agencies, which is due to the formation of a stable chemical linkage between the dyestuff molecule and the cellulose molecule. Often the total amount of dyestuff applied does not take part in the reaction with the fiber and in such cases the unreacted dyestuff is removed from the fiber by suitable aftertreatment, e.g., washing and/or soaping, if necessary at higher temperatures. For this purpose synthetic detergents can be used, e.g., alkylarylsulfonates, sodium lauryl sulfate, sodium lauryl polyglycol ether sulfate and mono- and dialkylphenylpolyglycol ethers.

The dyestuffs which contain water-solubilizing groups, e.g., one or two sulfonic acid groups, in the diazo component are well soluble in water giving solutions stable to salts and to hard water and therefore possess the great advantages that the non-fixed portion of dyestuff can be easily washed out of the prints or pad-dyeings and that the printing pastes or padding liquors are stable to storage.

The dyeings and prints on wool are brilliant and fast to light, washing, water, milling, acid, decatizing, crocking and dry cleaning. The bright dyeings and prints on fibers of natural or regenerated cellulose are notable for their excellent fastness to light, washing, water, perspiration, alkali, organic acids such as acetic acid and tartaric acid, crocking and dry cleaning. In addition they are white dischargeable with neutral or alkaline pastes or solutions containing, e.g., sodium hydrosulfite, sodium formaldehydesulfoxylate, etc.

The dyestuffs reserve acetate, triacetate and polyethylene terephthalate fibers.

In the following examples the parts and percentages are by weight and the temperatures in degrees centigrade.

Example 1

94 parts of 1,3-diaminobenzene-6-sulfonic acid are dissolved in 550 parts of water at 45–55° with the addition of sodium hydroxide solution. After the addition of 92 parts of 2,4,6-trichloropyrimidine the reaction mixture is stirred for about 8 hours at 45–55° and a constant weakly acid reaction is maintained by dropping in dilute sodium carbonate solution. On completion of condensation the mass is stirred for a few hours at room temperature. The crystallized reaction product is then filtered off. It can be dried with vacuum at 70–80°.

35.7 parts of the sodium 1-amino-3-(dichloropyrimidylamino)-benzene-6-sulfonate produced as described in the foregoing are dissolved with gentle heating in 1000 parts of water with an addition of dilute sodium carbonate solution to give weakly alkaline reaction. A solution of 7 parts of sodium nitrite in 30 parts of water is added and the mixture run into 30 parts of concentrated hydrochloric acid and 50 parts of ice, further ice being added so that the temperature of the reaction mass does not exceed 5°. After stirring for some time any excess of nitrous acid is destroyed by the addition of amidosulfonic acid.

Diazotization of the 1-amino-3-(dichloropyrimidylamino)-benzene-6-sulfonic acid can also be carried out directly at about 15° to 20°.

The diazotizing mass is run slowly with vigorous stirring into a mixture, cooled to 10°, of 35 parts of the neutral sodium salt of 1-hydroxynaphthalene-4,7-disulfonic acid, 25 parts of sodium bicarbonate and 600 parts of water. An orange-red monoazo dyestuff is formed. On completion of coupling the dyestuff is salted out with sodium chloride and after some time it is filtered off. The filter cake is washed with sodium chloride solution and dried with vacuum at 80°. On grinding, it is obtained as a brown-red powder which dissolves in water to give an orange-red solution.

A mercerized cotton fabric is printed with a paste of the following composition:

30 parts of the above dyestuff,
100 parts of urea,
385 parts of water,
450 parts of 4% sodium alginate thickening,
10 parts of sodium 1-nitrobenzene-3-sulfonate,
25 parts of sodium carbonate 1000 parts The print is dried and fixed by steaming for 10 minutes. It is then rinsed with cold and hot water, soaped at the boil if necessary, and again rinsed in hot and cold water and dried. A bright orange-red print is obtained which is very fast to light and washing.

Example 2

When the 35 parts of the sodium salt of 1-hydroxynaphthalene-4,7-disulfonic acid used in Example 1 are replaced by 35 parts of the sodium salt of 1-hydroxynaphthalene-4,6-disulfonic acid, a similar orange-red dyestuff is obtained.

Example 3

When the coupling component 1-hydroxynaphthalene-4,7-disulfonic acid used in Example 1 is replaced by a mixture of 1-hydroxynaphthalene-4,6-disulfonic acid and 1-hydroxynaphthalene-4,7-disulfonic acid (obtainable, for example, by the procedure described in German Patent 80,888), the product is an orange-red dyestuff with similar properties.

Example 4

50.3 parts of the monoazo dyestuff 1-hydroxy-2-(3'-amino)-phenylazonaphthalene-4,6,6'-trisulfonic acid (obtained by hydrolysis of the monoazo dyestuff produced by coupling 1-diazo-3-acetylaminobenzene-6-sulfonic acid with 1-hydroxynaphthalene-4,6-disulfonic acid) are dissolved as a sodium salt in 1200 parts of water with the addition of sodium hydroxide solution. The resulting solution is run slowly at 0–5° into a suspension of 18.6 parts of cyanuric chloride in 300 parts of ice, 200 parts of water and 1 part of concentrated hydrochloric acid, with dropwise addition of dilute sodium carbonate solution to maintain a constant weakly acid reaction. On completion of the reaction the dyestuff is salted out with sodium chloride and after a little time has elapsed it is filtered off. The filter cake is washed with sodium chloride solution and dried with vacuum at room temperature. It is a red powder which dissolves in water with an orange-red coloration.

A padding liquor is prepared with 10 parts of the above-dyestuff in 1000 parts of water and 10 parts of sodium carbonate are added to it immediately before use. A cotton fabric is impregnated with this solution, squeezed to give an increase of about 70% over the dry weight, rolled up, and lapped in rubberized cloths to prevent its drying. After standing for 3½ hours, the fabric is rinsed in cold and warm water, soaped at the boil for 15 minutes with a solution of 0.5 to 1 g. per liter of a non-ionic detergent and rinsed. A fixed, brilliant scarlet dyeing is obtained which is fast to boiling.

Example 5

A solution of 18.6 parts of cyanuric chloride in 80 parts of acetone is stirred into a mixture of 300 parts of ice, 200 parts of water and 1 part of 30% hydrochloric acid. Under the reaction conditions of Example 4, 50.3 parts of the monoazo dyestuff 1-hydroxy-2-(3'-amino)-phenylazonaphthalene-4,6,6'-trisulfonic acid are added. On completion of the reaction 17.3 parts of 1-aminobenzene-4-sulfonic acid in the form of an aqueous solution of the sodium salt are added and the temperature of the mixture raised to 35–40°. By the addition of dilute sodium carbonate solution the pH-value is maintained between 4 and 6. On completion of the reaction the dyestuff is precipitated with sodium chloride, filtered with suction, washed with sodium chloride solution and dried with vacuum at 40°. After grinding the dyestuff is obtained as a red powder which dissolves in water with an orange-red coloration.

A cotton fabric is impregnated with a solution of 10 parts of the above dyestuff, 150 parts of urea, 20 parts of sodium carbonate and 1000 parts of water, squeezed to give an increase of about 70% on the dry weight, and dried. The dyeing is subjected to dry heat treatment for about 4 minutes at 150°, then rinsed in cold and warm water, soaped at the boil for 15 minutes with a 0.05 to 0.1% solution of a non-ionic detergent, rinsed and dried. The cotton is dyed a brilliant scarlet shade fast to boiling.

2 parts of the above described dyestuff, 0.8 part of an oxethylated fatty amine and 0.5 part of an oleylpolyglycol ether are dissolved in 5000 parts of water, and 2 parts of glacial acetic acid are added to the solution. This dye-bath is heated to 40–50°, 100 parts of wool entered, and the bath brought to the boil in 30 minutes. It is boiled for 45 minutes and the wool then rinsed and dried. A level scarlet dyeing of very good light and wet fastness is obtained.

On completion of dyeing the dyebath may be neutralized with ammonia and the goods treated in it for 20 minutes at 90° in order to obtain somewhat better wet fastness. The same effect can be obtained by aftertreatment of the dyed goods in a fresh bath of 5000 parts of water and 3 parts of hexamethylene tetramine for 20–30 minutes at 90–95°.

The following table contains details of further dyestuffs of Formula I which can be produced according to the process of this invention. A and R have the meanings cited in Formula I.

| Example No. | A = Radical of— | H₂N—R—NH₂ | Coupling Component | Shade of Dyeing on Cotton Wool |
|---|---|---|---|---|
| 6 | 2-amino-4,6-dichloro-1,3,5-triazine. | 1,3-diaminobenzene-6-sulfonic acid. | 1-hydroxynaphthalene-4,6-disulfonic acid. | Orange-red. |
| 7 | 2-methylamino-4,6-dichloro-1,3,5-triazine. | do | do | Do. |
| 8 | 2,4,6-tribromopyrimidine | do | do | Do. |
| 9 | Cyanuric bromide | do | do | Do. |
| 10 | 2-amino-4,6-dibromo-1,3,5-triazine. | do | do | Do. |
| 11 | 2-dimethylamino-4,6-dichloro-1,3,5-triazine. | 1,4-diaminobenzene-2-sulfonic acid. | do | Red. |
| 12 | 2-(2'-hydroxyethylamino) 4,6-dichloro-1,3,5-triazine. | do | do | Do. |
| 13 | 2-phenylamino-4,6-dichloro-1,3,5-triazine-2'-sulfonic acid. | do | do | Do. |
| 14 | 2,4,6-trichloropyrimidine | do | 1-hydroxynaphthalene-4,7-disulfonic acid. | Do. |
| 15 | 2-(2'-carboxy)-phenyl-amino-4,6-dichloro-1,3-5-triazine. | 1,3-diaminobenzene-6-sulfonic acid. | do | Orange-red. |
| 16 | 2-(2'-carboxy)-ethyl-amino-4,6-dichloro-1,3,5-triazine. | do | do | Do. |
| 17 | 2-ethylamino-4,6-dichloro-1,3,5-triazine-2'-sulfonic acid. | do | do | Do. |
| 18 | 2-bis-(2'-hydroxyethyl)-amino-4,6-dichloro-1,3,5-triazine. | do | do | Do. |
| 19 | 2-(naphthyl-2'-amino)-4,6-dichloro-1,3,5-triazine-4',8'-disulfonic acid. | do | do | Do. |
| 20 | 2-(N-methyl-N-sulfo-ethylamino)-4,6-dichloro-1,3,5-triazine. | do | Mixture of 1-hydroxy-naphthalene-4,6- and-4,7-disulfonic acid. | Do. |
| 21 | 2-(4'-carboxy)-phenyl-amino-4,6-dichloro-1,3,5-triazine. | do | do | Do. |
| 22 | 2-phenylamino-4,6-dichloro-1,3,5-triazine-3'-sulfonic acid. | do | 1-hydroxy-naphthalene-4,6-disulfonic acid. | Do. |
| 23 | 2-(carboxymethyl-amino)-4,6-dibromo-1,3,5-triazine. | do | do | Do. |

| Example No. | A = Radical of— | H₂N—R—NH₂ | Coupling Component | Shade of Dyeing on Cotton Wool |
|---|---|---|---|---|
| 24 | 2-naphthyl-(2')-amino-4,6-dichloro-1,3,5-triazine-6'-sulfonic acid. | 1,3-diaminobenzene-6-sulfonic acid. | 1-hydroxy-naphthalene-4,6-disulfonic acid. | Orange-red. |
| 25 | 2-naphthyl-(1')-amino-4,6-dichloro-1,3,5-triazine-6'-(7')-sulfonic acid. | do | do | Do. |
| 26 | 2-(3'-carboxy)-phenyl-amino-4,6-dichloro-1,3,5-triazine. | do | do | Do. |
| 27 | Chloracetic acid chloride | do | Mixture of 1-hydroxy-naphthalene-4,6- and 4,7-disulfonic acid. | Do. |
| 28 | β-chloropropionic acid chloride. | do | do | Do. |
| 29 | Bromacetic acid chloride | 1,4-diaminobenzene-2-sulfonic acid. | do | Red. |
| 30 | Acrylic acid chloride | do | do | Do. |
| 31 | Methacrylic acid chloride. | 1,3-diaminobenzene-6-sulfonic acid. | do | Orange-red. |
| 32 | β-bromopropionic acid chloride. | 1,4-diaminonaphthalene-7-sulfonic-acid. | 1-hydroxynaphthalene-4,6-disulfonic acid. | Red. |

In the cyanuric ring the three carbon atoms are equivalent to each other so that the substitution products of the cyanuric halides are homogens.

In the pyrimidine ring

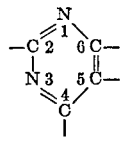

only the carbon atoms 4 and 6 are equivalent to each other and a halogen atom in the 5-position is so strongly bound that it practically does not react with an amino group. Thus, e.g., from trihalogenopyrimidines the following halogenopyrimidyl radicals are formed: 2,5-halogeno-pyrimidyl-(4) and 4,5 - dihalogenopyrimidyl - (2) (from 2,4,5-trihalogeno-pyrimidine), 2,6 - dihalogenopyrimidyl-(4) and 4,6-dihalogenopyrimidyl-(2) (from 2, 4,6-trihalogenopyrimidine).

Formulae of representative dyes of the foregoing examples are as follows:

Example 1:

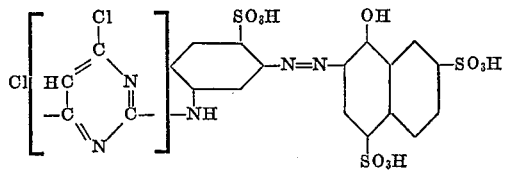

Example 2:

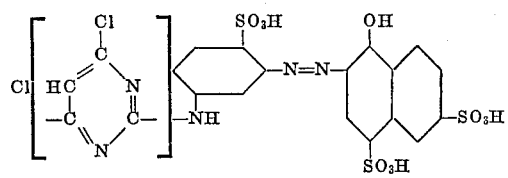

Example 3: Mixture of the dyes of Examples 1 and 2.

Example 4:

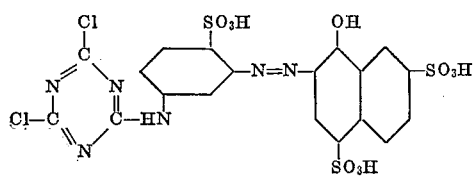

Example 5:

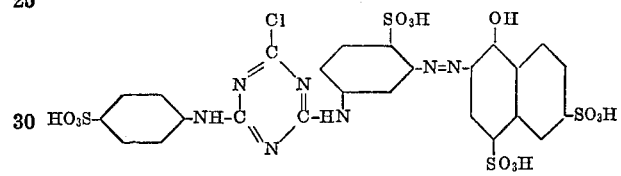

Example 6:

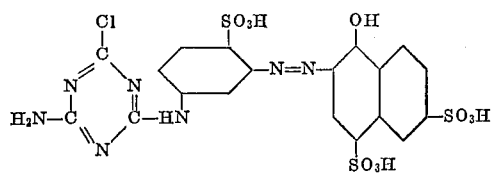

Having thus disclosed the invention what we claim is:

1. Reactive monoazo dye of the formula

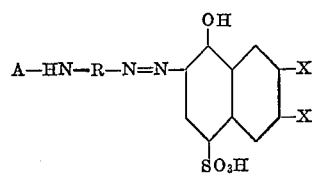

wherein A is a fiber-reactive radical selected from the group consisting of monohalogeno-lower alkanoyl, lower alkenoyl, 2,4-dihalogeno-1,3,5-triazinyl-(6), 2 - amino - 4-halogeno-1,3,5-triazinyl- (6), 2-lower alkylamino-4-halogeno - 1,3,5 - triazinyl - (6), 2-(di-lower alkyl)-amino-4-halogeno - 1,3,5 - triazinyl - (6), 2 - lower hydroxy-alkyl-amino - 4 - halogeno - 1,3,5-triazinyl-(6), 2-(di-lower hydroxy alkyl) - amino - 4 - halogeno-1,3,5-triazinyl-(6), 2-lower carboxyalkyl amino-4-halogeno-1,3,5-triazinyl-(6), 2-N-lower alkyl-N-lower sulfoalkyl-amino - 4 - halogeno-1,3,5-triazinyl-(6), 2-carboxyphenylamino - 4 - halogeno-1,3,5-triazinyl-(6), 2 - sulfophenylamino-4-halogeno-1,3,5-triazinyl-(6), 2 - sulfonaphthylamino-4-halogeno-1,3,5-triazinyl-(6), 2 - disulfonaphthylamino-4-halogeno-1,3,5-triazinyl-(6), 2,6-dihalogeno-pyrimidyl-(4) and 4,6-dihalogeno-pyrimidyl-(2), halogen having an atomic weight between 35 and 81; R is a radical selected from the group consisting of phenylene and naphthylene and bears from one to two sulfonic acid groups; one x is hydrogen, and the other x is —SO₃H.

2. The reactive dye of the formula
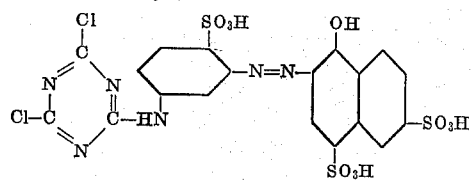
3. The reactive dye of the formula
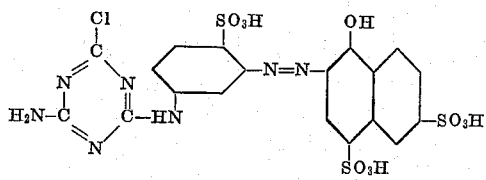
4. The reactive dye of the formula
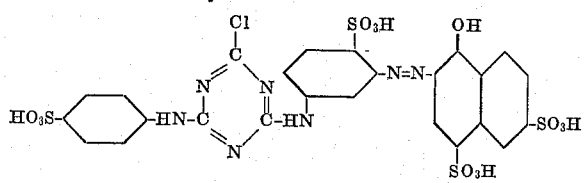
5. The reactive dye of the formula
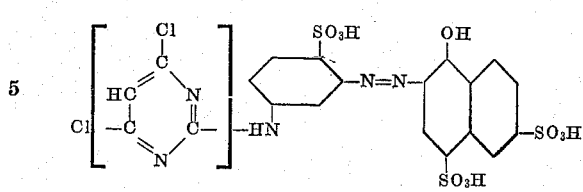
References Cited by the Examiner
UNITED STATES PATENTS
| | | | |
|---|---|---|---|
| 2,935,506 | 5/60 | Heslop et al. | 260—154 |
| 2,945,021 | 7/60 | Fasciati et al. | 260—153 |
| 2,993,885 | 7/61 | Fasciati | 260—200 |
| 3,093,628 | 6/63 | Benz et al. | 260—153 |
| 3,114,746 | 12/63 | Benz et al. | 260—163 |
FOREIGN PATENTS
| | | |
|---|---|---|
| 80,888 | 4/85 | Germany. |
| 569,964 | 1/59 | Belgium. |
CHARLES B. PARKER, *Primary Examiner.*
L. ZITVER, *Examiner.*